Feb. 15, 1949.　　　A. J. VASSELLI　　　2,461,859
TRANSMISSION BELT JOINT
Filed Nov. 12, 1947

INVENTOR.
Anthony J. Vasselli
BY
Angelo M. Picarro
ATTORNEY

Patented Feb. 15, 1949

2,461,859

UNITED STATES PATENT OFFICE 2,461,859

TRANSMISSION BELT JOINT

Anthony J. Vasselli, Newark, N. J.

Application November 12, 1947, Serial No. 785,283

1 Claim. (Cl. 24—38)

This invention relates to novel articles of manufacture and more particularly to endless flexible belts. In one of its more specific aspects the invention relates to novel belt splicings or joints for endless flexible transmission belts.

The primary object of this invention is to provide endless flexible power transmission belts whose ends are joined together in a simple and unique manner eliminating the use of metal staples or clamps while providing rugged joints.

This as well as other objects of this invention will be readily apparent from the following description and drawings, wherein, Fig. 1 is a top plan view of cutter design which may be employed for producing the male and female ends of a belt embodying the invention.

This invention finds especial application and utility in the field of leather power transmission belting in which the width of the belting material is in the range of 1–3 inches and the invention will therefore be described in reference thereto.

Figure 1:
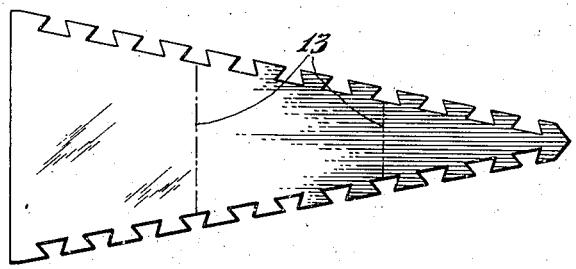
Figure 2:
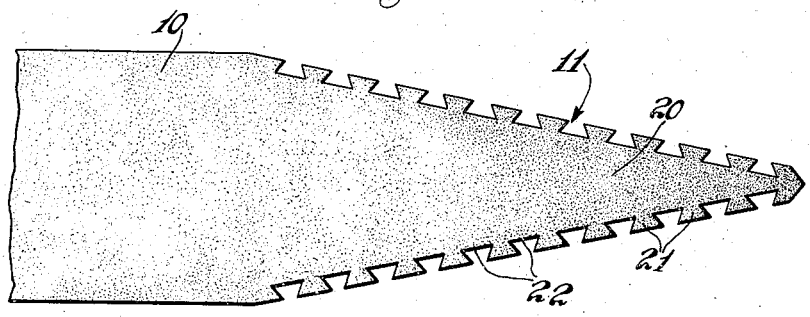
Fig. 2 is a top plan fragmentary view illustrating the male end of a band embodying the invention.
Figure 3:
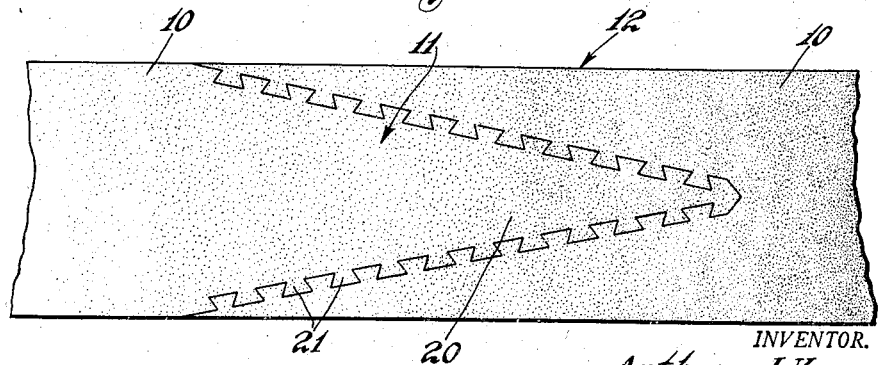
Fig. 3 is a top plan view of the joint of a power transmission belt embodying this invention.

As shown in the drawing a stretch or band of leather belting material 10 of appropriate length and of a width of 1–3 inches is first laid flat. Then one end thereof is inserted into a die and onto the male cutter thereof having cutting edges of appropriate contour and design. Then the female cutter of corresponding design is brought down against the end of said material whereby there is cut out a male end 11. The other end of the material is in reverse and may be placed in the die which is operated upon by its cutters to provide a female end 12 which is complementary to the male end 11. By employing a die whose male and female cutters have the contour shown in Fig. 1, it is possible to cut with a single die the standard widths of belting material of 1–3 inches. The upper face of the male die has lines at 13 indicating the position of the ends of the different width bands for cutting.

The male end 11 is of a generally triangular body 20 having a plurality of spaced dovetail tabs 21 extending outwardly from the sides thereof. The spaces 22 between adjacent faces of tabs 21 are also dovetail and of the same size as tabs 21, but disposed in reverse position. The altitude of the triangular body 20 is approximately on the longitudinal center line of the band 10. The inner faces of the spaces 22 are on one of the sides of the triangular body portion and each of these sides is approximately at an angle of 12°30″ to said altitude and by that I mean that this angle is 12°30″±2°. The outermost faces of the tabs 21 are on a line approximately parallel to the adjacent side of the triangular body 20 so that the length of tabs 21, which is the distance from the outer face thereof to a side of the triangular body, is roughly equal throughout. The width of the throat as well as the length of each tab is each approximately equal to the average thickness of the band 10.

By providing a male end 11 of the aforesaid design and a female end 12 of complementary design in the manner heretofore set forth, the male end 11 may be coupled with the female end 12 to provide a rugged endless transmission belt consisting of a single band of material. If desired, an adhesive, such as glue or the like may be employed on the interfaces of the male and female elements.

I claim:

An endless flexible leather transmission belt, said belt comprising a band having complementary male and female ends interlocked with each other, said male end being roughly a triangular body with a plurality of spaced dovetail tabs extending outwardly from the sides thereof, with the space between adjacent tabs being dove-tail openings, the altitude of said triangular body being approximately coincidental with the longitudinal center line of said band, the angle between said longitudinal center and each side of said triangular body being approximately 12°30″, the width of the throat of each tab being approximately equal to the average thickness of said band, the outermost limit of the tabs on each side of said triangular body being roughly in a line approximately parallel to that side of the triangular body adjacent thereto.

ANTHONY J. VASSELLI.

REFERENCES CITED

The following references are of record in the file of this patent:

UNITED STATES PATENTS

| Number | Name | Date |
|---|---|---|
| 1,588,255 | Maxwell | June 8, 1926 |

FOREIGN PATENTS

| Number | Country | Date |
|---|---|---|
| 13,517 | Great Britain | June 11, 1907 |
| 86,431 | Switzerland | Oct. 16, 1920 |